(12) United States Patent
Relke

(10) Patent No.: US 8,120,646 B2
(45) Date of Patent: Feb. 21, 2012

(54) SPATIAL REPRESENTATION ASSEMBLY

(75) Inventor: Ingo Relke, Jena (DE)

(73) Assignee: Phoenix 3D, Inc., Merrick, NY (US)

( * ) Notice: Subject to any disclaimer, the term of this patent is extended or adjusted under 35 U.S.C. 154(b) by 1510 days.

(21) Appl. No.: 10/558,855

(22) PCT Filed: May 26, 2004

(86) PCT No.: PCT/EP2004/005661
§ 371 (c)(1),
(2), (4) Date: Nov. 30, 2005

(87) PCT Pub. No.: WO2004/107019
PCT Pub. Date: Dec. 9, 2004

(65) Prior Publication Data
US 2006/0256435 A1    Nov. 16, 2006

(30) Foreign Application Priority Data
May 30, 2003   (DE) .................................. 103 25 146

(51) Int. Cl.
*H04N 13/00* (2006.01)
(52) U.S. Cl. ............................................. 348/51; 348/42
(58) Field of Classification Search .................. None
See application file for complete search history.

(56) References Cited

U.S. PATENT DOCUMENTS

| | | |
|---|---|---|
| 4,594,662 A | 6/1986 | Devaney |
| 4,829,365 A | 5/1989 | Eichenlaub |
| 4,872,750 A | 10/1989 | Morishita |
| 5,083,199 A | 1/1992 | Börner |
| 5,113,213 A | 5/1992 | Sandor et al. |
| 5,132,839 A | 7/1992 | Travis |
| 5,264,964 A | 11/1993 | Faris |
| 5,349,379 A | 9/1994 | Eichenlaub |
| 5,519,533 A | 5/1996 | Nomura et al. |

(Continued)

FOREIGN PATENT DOCUMENTS

DE        195 02 643 A1    8/1996

(Continued)

OTHER PUBLICATIONS

Alexander Schmidt, et al., "Multi-viewpoint Autostereoscopic Displays from 4D-Vision," *Proceedings of the SPIE*, SPIE, Bellingham, VA, US, vol. 4660, Jan. 21, 2002 (pp. 212-221).

(Continued)

*Primary Examiner* — Christopher S Kelley
*Assistant Examiner* — Christopher Findley
(74) *Attorney, Agent, or Firm* — 24IP Law Group

(57) ABSTRACT

The invention relates to arrangements for spatially displaying a scene or object, in which a great number of individual pixels $\alpha_{ij}$ in a grid of rows (j) and columns (i) are made visible simultaneously, with the pixels ($\alpha_{ij}$) presenting bits of partial information from several views $A_k$ (k=1 ... n) of the scene or object, and in which propagation directions for the light radiated by the pixels ($\alpha_{ij}$) are established by means of a structured plate. The structured plate contains a great number of optical imaging elements ($\beta_{pq}$) arranged in a grid of rows (q) and columns (p). According to the invention, at least two of the following kinds of optical imaging elements ($\beta_{pq}$) are simultaneously provided on the structured plate, viz. wavelength or gray level filter, lens or cylinder lens, and/or prism.

2 Claims, 8 Drawing Sheets

| p→ | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| q 1 | S | S | S | S | T | S | S | S | S | S | S | T | S | S | S | S | S | S | S | S | T |
| 2 | S | S | S | S | T | S | S | S | S | S | S | T | S | S | S | S | S | S | S | S | T |
| 3 | | | L | | | | | | | L | | | | | | L | | | | | |
| 4 | S | S | T | S | S | S | S | S | S | T | S | S | S | S | S | S | T | S | S | | |
| 5 | S | S | T | S | S | S | S | S | S | T | S | S | S | S | S | S | T | S | S | | |
| 6 | L | | | | | L | | | | | | L | | | | | | | | | |
| 7 | T | S | S | S | S | S | S | T | S | S | S | S | S | T | S | S | S | | | | |
| 8 | T | S | S | S | S | S | S | T | S | S | S | S | S | T | S | S | S | | | | |
| 9 | | | | | L | | | | | | L | | | | | | | | | | |
| 10 | S | S | S | S | S | T | S | S | S | S | S | T | S | S | S | S | S | | | | |
| 11 | S | S | S | S | S | T | S | S | S | S | S | T | S | S | S | S | S | | | | |
| 12 | | | L | | | | | L | | | | | | | | | | | | | |
| 13 | S | S | S | T | S | S | S | S | S | T | S | S | S | S | S | T | | | | | |
| 14 | S | S | S | T | S | S | S | S | S | T | S | S | S | S | S | T | | | | | |
| 15 | | L | | | | | L | | | | | L | | | | | | | | | |
| 16 | S | S | T | S | S | S | S | S | T | S | S | S | S | S | T | S | S | | | | |

U.S. PATENT DOCUMENTS

| | | | |
|---|---|---|---|
| 5,550,676 A | 8/1996 | Ohe et al. |
| 5,584,556 A | 12/1996 | Yokoyama et al. |
| 5,703,717 A | 12/1997 | Ezra et al. |
| 5,717,522 A | 2/1998 | Hattori et al. |
| 5,729,011 A | 3/1998 | Sekiguchi |
| 5,751,479 A | 5/1998 | Hamagishi et al. |
| 5,777,787 A | 7/1998 | Lüder et al. |
| 5,831,765 A | 11/1998 | Nakayama et al. |
| 5,858,624 A | 1/1999 | Chou et al. |
| 5,897,184 A | 4/1999 | Eichenlaub et al. |
| 5,917,562 A | 6/1999 | Woodgate et al. |
| 5,936,774 A * | 8/1999 | Street .......................... 359/630 |
| 5,938,774 A | 8/1999 | Hsu |
| 5,945,965 A | 8/1999 | Inoguchi et al. |
| 5,949,390 A | 9/1999 | Nomura et al. |
| 6,026,215 A | 2/2000 | Fantone et al. |
| 6,040,807 A | 3/2000 | Hamagishi et al. |
| 6,046,849 A | 4/2000 | Moseley et al. |
| 6,055,013 A | 4/2000 | Woodgate et al. |
| 6,061,083 A | 5/2000 | Aritake et al. |
| 6,078,423 A | 6/2000 | Orr et al. |
| 6,087,766 A | 7/2000 | Janning |
| 6,094,216 A | 7/2000 | Taniguchi et al. |
| 6,118,584 A | 9/2000 | Van Berkel et al. |
| 6,169,629 B1 | 1/2001 | Otsubo |
| 6,219,184 B1 | 4/2001 | Nagatani |
| 6,266,187 B1 | 7/2001 | Dunn et al. |
| 6,302,541 B1 | 10/2001 | Grossmann |
| 6,309,477 B1 | 10/2001 | Shimakura et al. |
| 6,337,721 B1 | 1/2002 | Hamagishi et al. |
| 6,483,644 B1 | 11/2002 | Gottfried et al. |
| 6,483,735 B1 | 11/2002 | Rentzepis |
| 6,504,583 B2 | 1/2003 | Li et al. |
| 6,519,088 B1 | 2/2003 | Lipton |
| 6,519,379 B1 | 2/2003 | Izawa et al. |
| 6,791,570 B1 | 9/2004 | Schwerdtner et al. |
| 6,859,275 B2 | 2/2005 | Fateley et al. |
| 6,877,857 B2 * | 4/2005 | Perlin .............................. 353/7 |
| 6,970,187 B1 | 11/2005 | Horimai et al. |
| 6,972,744 B1 | 12/2005 | Allio |
| 6,999,110 B2 | 2/2006 | Kobayashi |
| 7,046,271 B2 | 5/2006 | Doerfel et al. |
| 2002/0101658 A1 | 8/2002 | Hoppenstein |
| 2003/0016444 A1* | 1/2003 | Brown et al. .................. 359/462 |
| 2003/0067460 A1 | 4/2003 | Tomono |
| 2003/0067539 A1 | 4/2003 | Doerfel et al. |
| 2004/0130503 A1 | 7/2004 | Hamagishi et al. |
| 2004/0165263 A1 | 8/2004 | Sudo et al. |
| 2004/0245440 A1 | 12/2004 | Klippstein et al. |

FOREIGN PATENT DOCUMENTS

| | | |
|---|---|---|
| DE | 195 06 648 C2 | 8/1996 |
| DE | 198 27 590 C2 | 12/1999 |
| DE | 200 02 149 U1 | 5/2000 |
| DE | 100 15 796 A1 | 10/2001 |
| DE | 102 45 611 A1 | 4/2003 |
| EP | 0 316 465 A1 | 5/1989 |
| EP | 0 708 431 A2 | 4/1996 |
| EP | 0 744 872 A2 | 11/1996 |
| EP | 0 773 707 A2 | 5/1997 |
| EP | 0 791 847 A1 | 8/1997 |
| EP | 0 860 728 A1 | 8/1998 |
| EP | 0 977 445 A2 | 2/2000 |
| EP | 1 069 454 A1 | 1/2001 |
| EP | 1 122 957 A1 | 8/2001 |
| GB | 514426 | 3/1939 |
| JP | 3-119889 | 5/1991 |
| JP | 08036145 A | 2/1996 |
| JP | 08146347 A | 6/1996 |
| JP | 08163605 A | 6/1996 |
| JP | 08194190 A | 7/1996 |
| JP | 08327945 A | 12/1996 |
| JP | 08331605 A | 12/1996 |
| JP | 09015549 A | 1/1997 |
| JP | 09138370 A | 5/1997 |
| JP | 09281440 A | 10/1997 |
| JP | 09304739 A | 11/1997 |
| JP | 10026740 A | 1/1998 |
| JP | 10186272 A | 7/1998 |
| JP | 10268230 A | 10/1998 |
| JP | 10333090 A | 12/1998 |
| JP | 2000201360 A | 7/2000 |
| JP | 2001033731 A | 2/2001 |
| JP | 2001042258 A | 2/2001 |
| JP | 2001073162 A | 3/2001 |
| JP | 2002040956 A | 2/2002 |
| JP | 2002072135 A | 3/2002 |
| JP | 2002202477 A | 7/2002 |
| JP | 2002287087 A | 10/2002 |
| JP | 2002287088 A | 10/2002 |
| JP | 2002287089 A | 10/2002 |
| WO | WO 94/06049 | 3/1994 |
| WO | WO 97/02709 | 1/1997 |
| WO | WO 97/22033 | 6/1997 |
| WO | WO 98/27451 | 6/1998 |
| WO | WO 99/49349 | 9/1999 |
| WO | WO 00/10332 | 2/2000 |
| WO | WO 00/28517 | 5/2000 |
| WO | WO 00/43831 | 7/2000 |
| WO | WO 01/31384 A1 | 5/2001 |
| WO | WO 01/37579 A1 | 5/2001 |
| WO | WO 01/56265 A2 | 8/2001 |
| WO | WO 01/77894 A1 | 10/2001 |
| WO | WO 02/19012 A1 | 3/2002 |

OTHER PUBLICATIONS

Sam H. Kaplan, "Theory of Parallax Barriers," *Journal of the SMPTE*, vol. 59, Jul. 1952 (pp. 11-21).

* cited by examiner

| p→ | 1 | | | | | | | | | | | | | | | | | | | | | |
|---|---|---|---|---|---|---|---|---|---|---|---|---|---|---|---|---|---|---|---|---|---|---|
| q↓ | | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | S | S | S | S | S | T | S | S | S | S | S | S | S | S | S | S | S | S | S | S | S | T |
| 2 | S | S | S | S | S | T | S | S | S | S | S | S | S | T | S | S | S | S | S | S | S | T |
| 3 | | | | | L | | | | | | | | L | | | | | | | | | |
| 4 | S | S | T | S | S | S | S | S | S | S | T | S | S | S | S | S | S | S | T | S | S | S |
| 5 | S | S | T | S | S | S | S | S | S | S | T | S | S | S | S | S | S | S | T | S | S | S |
| 6 | T | T | S | L | S | | S | S | L | S | S | L | S | S | S | S | S | L | S | S | S | S |
| 7 | S | S | S | S | S | S | S | S | S | S | S | S | S | S | S | T | T | S | S | S | S | S |
| 8 | S | S | S | S | S | S | S | L | S | S | S | S | S | S | S | T | T | S | S | S | S | S |
| 9 | S | L | S | S | | S | T | L | S | S | S | | S | S | S | L | S | S | S | S | S | S |
| 10 | S | S | S | S | S | S | T | S | S | S | S | S | S | S | T | S | S | S | S | S | S | S |
| 11 | S | S | S | S | S | S | T | S | S | S | S | S | S | S | T | S | S | S | S | S | S | S |
| 12 | | | | | | | | | | | | | L | | | | | | | | | |
| 13 | S | S | S | S | T | S | S | S | S | S | S | S | T | S | S | S | S | S | S | S | T | T |
| 14 | S | S | S | S | T | S | S | S | S | S | S | S | T | S | S | S | S | S | S | S | T | T |
| 15 | | | | L | | | | | | | | L | | | | | | | | | L | |
| 16 | S | S | T | S | S | S | S | S | S | T | S | S | S | S | S | S | S | S | T | S | S | S |

| | R 1 | G 2 | B 3 | R 4 | G 5 | B 6 | R 7 | G 8 | B 9 | R 10 | G 11 | B 12 | R 13 | G 14 | B 15 | R 16 | G 17 | B 18 | R 19 | G 20 | B 21 |
|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 4 | 4 | 5 | 6 | 7 | 8 | 1 | 2 | 3 | 4 | 5 | 6 | 7 | 8 | 1 | 2 | 3 | 4 | 5 | 6 | 7 | 8 |
| 5 | 5 | 6 | 7 | 8 | 1 | 2 | 3 | 4 | 5 | 6 | 7 | 8 | 1 | 2 | 3 | 4 | 5 | 6 | 7 | 8 | 1 |
| 6 | 6 | 7 | 8 | 1 | 2 | 3 | 4 | 5 | 6 | 7 | 8 | 1 | 2 | 3 | 4 | 5 | 6 | 7 | 8 | 1 | 2 |
| 7 | 6 | 7 | 8 | 1 | 2 | 3 | 4 | 5 | 6 | 7 | 8 | 1 | 2 | 3 | 4 | 5 | 6 | 7 | 8 | 1 | 2 |
| 8 | 7 | 8 | 1 | 2 | 3 | 4 | 5 | 6 | 7 | 8 | 1 | 2 | 3 | 4 | 5 | 6 | 7 | 8 | 1 | 2 | 3 |
| 9 | 8 | 1 | 2 | 3 | 4 | 5 | 6 | 7 | 8 | 1 | 2 | 3 | 4 | 5 | 6 | 7 | 8 | 1 | 2 | 3 | 4 |
| 10 | 8 | 1 | 2 | 3 | 4 | 5 | 6 | 7 | 8 | 1 | 2 | 3 | 4 | 5 | 6 | 7 | 8 | 1 | 2 | 3 | 4 |
| 11 | 1 | 2 | 3 | 4 | 5 | 6 | 7 | 8 | 1 | 2 | 3 | 4 | 5 | 6 | 7 | 8 | 1 | 2 | 3 | 4 | 5 |
| 12 | 2 | 3 | 4 | 5 | 6 | 7 | 8 | 1 | 2 | 3 | 4 | 5 | 6 | 7 | 8 | 1 | 2 | 3 | 4 | 5 | 6 |
| 13 | 2 | 3 | 4 | 5 | 6 | 7 | 8 | 1 | 2 | 3 | 4 | 5 | 6 | 7 | 8 | 1 | 2 | 3 | 4 | 5 | 6 |
| 14 | 3 | 4 | 5 | 6 | 7 | 8 | 1 | 2 | 3 | 4 | 5 | 6 | 7 | 8 | 1 | 2 | 3 | 4 | 5 | 6 | 7 |
| 15 | 4 | 5 | 6 | 7 | 8 | 1 | 2 | 3 | 4 | 5 | 6 | 7 | 8 | 1 | 2 | 3 | 4 | 5 | 6 | 7 | 8 |
| 16 | 4 | 5 | 6 | 7 | 8 | 1 | 2 | 3 | 4 | 5 | 6 | 7 | 8 | 1 | 2 | 3 | 4 | 5 | 6 | 7 | 8 |

Fig.2

| p\q | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | S | S | S | S | T | S | S | S | S | S | S | S | T | S | S | S | S | S | S | S | T |
| 2 | S | | | L | | | | | S | | | | L | | | | S | | L | | |
| 3 | S | T | S | S | S | S | S | T | S | S | S | S | S | S | S | S | S | T | S | S | S |
| 4 | | | L | | | | | L | | | | | | | L | | | L | | | |
| 5 | T | S | S | S | S | S | S | S | S | T | S | S | S | S | S | S | T | S | S | S | S |
| 6 | L | | | | | | L | | | L | | | | L | | | L | | | | |
| 7 | S | S | S | S | S | S | S | T | S | S | S | T | S | S | S | S | S | S | S | S | S |
| 8 | S | | | | L | | L | | | | L | | | | L | | | | L | | |
| 9 | S | S | T | S | S | T | S | S | S | S | S | S | S | T | S | S | S | S | S | T | S |
| 10 | S | | | | L | | | | L | | | | L | | | | S | | L | | |
| 11 | S | S | S | T | S | S | S | S | T | S | S | S | S | S | S | S | T | S | S | S | S |
| 12 | T | | | L | | | L | | L | | | | L | | | | L | | L | | |
| 13 | S | S | S | S | S | S | S | S | T | S | S | S | S | S | S | S | S | S | S | S | S |
| 14 | L | | | | | L | L | | L | | | | L | | L | | L | | | | |
| 15 | S | S | S | S | S | S | S | S | S | S | S | S | S | S | S | S | S | S | S | S | S |
| 16 | | | | | | L | L | | | | | | | L | L | | | | | | |

Fig.5

| | R 1 | G 2 | B 3 | R 4 | G 5 | B 6 | R 7 | G 8 | B 9 | R 10 | G 11 | B 12 | R 13 | G 14 | B 15 | R 16 | G 17 | B 18 | R 19 | G 20 | B 21 |
|---|---|---|---|---|---|---|---|---|---|---|---|---|---|---|---|---|---|---|---|---|---|
| 1 | 1 | 2 | 3 | 4 | 5 | 6 | 7 | 8 | 1 | 2 | 3 | 4 | 5 | 6 | 7 | 8 | 1 | 2 | 3 | 4 | 5 |
| 2 | 1 | 2 | 3 | 4 | 5 | 6 | 7 | 8 | 1 | 2 | 3 | 4 | 5 | 6 | 7 | 8 | 1 | 2 | 3 | 4 | 5 |
| 3 | 3 | 4 | 5 | 6 | 7 | 8 | 1 | 2 | 3 | 4 | 5 | 6 | 7 | 8 | 1 | 2 | 3 | 4 | 5 | 6 | 7 |
| 4 | 3 | 4 | 5 | 6 | 7 | 8 | 1 | 2 | 3 | 4 | 5 | 6 | 7 | 8 | 1 | 2 | 3 | 4 | 5 | 6 | 7 |
| 5 | 5 | 6 | 7 | 8 | 1 | 2 | 3 | 4 | 5 | 6 | 7 | 8 | 1 | 2 | 3 | 4 | 5 | 6 | 7 | 8 | 1 |
| 6 | 5 | 6 | 7 | 8 | 1 | 2 | 3 | 4 | 5 | 6 | 7 | 8 | 1 | 2 | 3 | 4 | 5 | 6 | 7 | 8 | 1 |
| 7 | 7 | 8 | 1 | 2 | 3 | 4 | 5 | 6 | 7 | 8 | 1 | 2 | 3 | 4 | 5 | 6 | 7 | 8 | 1 | 2 | 3 |
| 8 | 7 | 8 | 1 | 2 | 3 | 4 | 5 | 6 | 7 | 8 | 1 | 2 | 3 | 4 | 5 | 6 | 7 | 8 | 1 | 2 | 3 |
| 9 | 1 | 2 | 3 | 4 | 5 | 6 | 7 | 8 | 1 | 2 | 3 | 4 | 5 | 6 | 7 | 8 | 1 | 2 | 3 | 4 | 5 |
| 10 | 1 | 2 | 3 | 4 | 5 | 6 | 7 | 8 | 1 | 2 | 3 | 4 | 5 | 6 | 7 | 8 | 1 | 2 | 3 | 4 | 5 |
| 11 | 3 | 4 | 5 | 6 | 7 | 8 | 1 | 2 | 3 | 4 | 5 | 6 | 7 | 8 | 1 | 2 | 3 | 4 | 5 | 6 | 7 |
| 12 | 3 | 4 | 5 | 6 | 7 | 8 | 1 | 2 | 3 | 4 | 5 | 6 | 7 | 8 | 1 | 2 | 3 | 4 | 5 | 6 | 7 |
| 13 | 5 | 6 | 7 | 8 | 1 | 2 | 3 | 4 | 5 | 6 | 7 | 8 | 1 | 2 | 3 | 4 | 5 | 6 | 7 | 8 | 1 |
| 14 | 5 | 6 | 7 | 8 | 1 | 2 | 3 | 4 | 5 | 6 | 7 | 8 | 1 | 2 | 3 | 4 | 5 | 6 | 7 | 8 | 1 |
| 15 | 7 | 8 | 1 | 2 | 3 | 4 | 5 | 6 | 7 | 8 | 1 | 2 | 3 | 4 | 5 | 6 | 7 | 8 | 1 | 2 | 3 |
| 16 | 7 | 8 | 1 | 2 | 3 | 4 | 5 | 6 | 7 | 8 | 1 | 2 | 3 | 4 | 5 | 6 | 7 | 8 | 1 | 2 | 3 |

Fig.6

SPATIAL REPRESENTATION ASSEMBLY

FIELD OF THE INVENTION

The invention relates to arrangements for three-dimensional display, especially to such that provide a spatial impression to one or several viewers without any aids such as filter goggles.

BACKGROUND OF THE INVENTION

Efforts to make images of objects, sceneries, views of the interior of bodies and other things appear to a viewer to have three dimensions have, in the course of development, resulted in a great number of autostereoscopic methods.

Some of these methods are based on the principle that several optical views of a scene or object recorded from different angles ("perspective views"), while displayed simultaneously, are separated by suitable means so that either eye of a viewer sees only one of these views, or several but different views, resulting in a parallax effect that makes the image appear spatial.

EP 0791847 describes an arrangement in which autostereoscopic presentations are made by means of an RGB LC display used in combination with obliquely positioned lenticulars, which, in principle, produces moiré patterns. To reduce the moiré pattern, the said publication suggests that the wavelength filters assigned to the subpixels be arranged in a different configuration. The implementation of this suggestion involves the disadvantage that alterations to tried-and-approved embodiments and manufacturing processes have to be made, which would be too expensive in view of industrial quantity production of the commonly used RGB LC displays. Moreover, the measure suggested does not eliminate the disadvantages in the case of two-dimensional presentations, so that there is no consistently high image quality when the arrangement is switched over from autostereoscopic to two-dimensional presentation. The said publication relates to an arrangement in which lenticulars are used to produce the autostereoscopic presentation.

In U.S. Pat. No. 5,936,774, autostereoscopic display is based on structured light sources, which may be structured, e.g., according to their spectral properties. These interact with lens-like optical elements, which, for each perspective view, projects a group of light concentrations generated at certain distances onto specified regions of light modulators, e.g., LC displays. With these arrangements, the unfavorable effects described above also occur.

In JP 10333090, the authors suggest the use of colored illumination and wavelength filters for the directional selection of the light coming from the perspective views. An added optical filter is intended to reduce the light volume in specified wavelength ranges. This is a two-channel method based on only two perspective views, with either of the viewer's eyes being offered one of these views. According to the publication, the width of a filter element or that of an illumination element, respectively, is approximately twice the width of a subpixel in an LC display. Inevitably, this means that conventional LC cannot be used to produce the structured illumination, because the subpixel color structure of these displays is of the RGBRGBRGB . . . type. Moreover, the periodically arranged, stripe-shaped wavelength filters inevitably produce moire fringes again. An added disadvantage is the fixed distance from the image plane specified for the viewer, which derives from the equations and functions given.

JP 8163605 also describes an arrangement using two perspective views. Each of the pixels on which the views are presented is definitely visible to only one of the viewer's eyes. For directional selection of the light coming from the pixels, stripe-shaped wavelength filters are arranged in front of a display or a stripe-shaped RGB illuminating element. Here again, the disadvantages described above occur.

According to the description in JP 8146347, directional selection is effected by means of a separate transparent-opaque barrier corresponding with a wavelength filter, the transparent areas of the barrier, or the translucent areas of the wavelength filter are either slot-shaped or circular. The arrangement also has the disadvantages described above, and the same also applies to the arrangement described in JP 8146346, which uses a two-channel method with stripe-shaped wavelength filters for assigning directions to the two perspective views.

U.S. Pat. No. 5,568,313 describes an improvement of lenticular screens for 3D display by the attachment of a kind of added barrier extending all over the rear side of the lenticular. For 3D presentation, a picture assembled from stripes is placed below. The drawback is that the greater brightness achieved by imaging through a lenticular compared to imaging through a barrier is thwarted because of the added barrier extending over the entire rear side of the lenticular.

WO 01/56526 of the present applicant describes a method of spatial display achieved by means of a wavelength filter array (in special embodiments, by means of a gray level filter array) thanks to the definition of light propagation directions for light from different pixels, so that either of the viewer's eyes predominantly sees bits of partial image information from a particular selection from the views shown.

SUMMARY OF THE INVENTION

Based on the prior art described, it is the purpose of the present invention to achieve, with few optical components, an autostereoscopic presentation with improved perceptibility, and especially with high brightness.

According to the invention, the problem is solved by an arrangement for spatially displaying a scene or object,
  comprising an image display device, on which a great number of individual picture elements (pixels) $\alpha_{ij}$ arranged in a grid of rows j and columns i are made visible simultaneously, the said pixels $\alpha_{ij}$ rendering bits of partial information from several views $A_k$ (k=1 . . . n, n>1) of the scene or object,
  and further comprising a structured plate, arranged in front of or behind the image display device, by means of which propagation directions are established for the light radiated by the pixels $\alpha_{ij}$,
  and in which the structured plate contains a great number of optical imaging elements $\beta_{pq}$ arranged in a grid of rows q and columns p and intended for establishing the said propagation directions, such a structured plate to be provided simultaneously with at least two of the following kinds $\lambda_b$ of optical imaging elements $\beta_{pq}$, viz. wavelength or gray level filter, lens or cylinder lens, prism,
  and in which, within a viewing space occupied by the viewer(s), the said propagation directions intersect in a great number of intersection points, each of which corresponds to a viewing position,
  so that, from any of these viewing positions, a viewer sees bits of partial information from a first selection with one eye and bits of partial information from a second selection of views $A_k$ (k=1 . . . n) with the other eye.

Preferably, the structured plate is located in front of the image display device (in viewing direction), but it may also be arranged behind it.

Due to the structured plate used in it, the method in particular ensures that, with the partial use of lenses, cylinder lenses or prisms, the spatial image seen has a higher brightness than that achieved, for example, with a pure barrier method; and in so far as, at least partially, color or gray level filters are used, a sharply focused 3D image is produced.

The combination on the structured plate of lenses (preferably cylinder lenses) and color or gray level filters is, as it were, a synthesis of the well-known 3D presentation method based on lenticulars and that based on filter elements.

In the method according to the invention, the propagation directions can, in one version, be established in such a way that the said first and second selections made from the views $A_k$ (k=1 ... n) comprise exactly one view each, which, of course, is true for a few selected viewing positions only, as a rule. For a particular viewing position, the first and the second selection may, for example, exclusively comprise view 1 and view 3, respectively; a viewer would then see exclusively bits of partial information from view 1 with one eye and exclusively bits of partial information from view 3 with the other eye (and thus have a spatial impression).

In another version, the propagation directions may be established in such a way that the said first and second selections made from the views $A_k$ (k=1 ... n) each comprise several of the views $A_k$ (k=1 ... n), with one or several views jointly having a dominant share in each of the two selections.

For a particular viewing position, the first selection may, for example, simultaneously comprise view 1 (with a share of two thirds) and view 2 (with a share of one third), whereas the second selection comprises view 3 (with a share of two thirds) and view 4 (with a share of one third). A viewer would then see bits of partial information from view 1 (two thirds) and from view 2 (one third) with one eye and bits of partial information from view 3 (two thirds) and from view 4 (one third) with the other eye (and thus again have a spatial impression).

Preferably, the image display device is coupled with an electronic control system in such a way that bits of partial information from the views $A_k$ (k=1 ... n) are assigned to pixels $\alpha_{ij}$ of the position ij according to the equation $$k = i - c_{ij} \cdot j - n' \cdot IntegerPart\left[\frac{i - c_{ij} \cdot j - 1}{n'}\right]$$

where
i is the index of a pixel $\alpha_{ij}$ in a row of the grid,
j is the index of a pixel $\alpha_{ij}$ in a column of the grid,
k is the consecutive number of the view $A_k$ (k=1 ... n) from which the partial information to be presented by a particular pixel $\alpha_{ij}$ originates,
n' is an integral number greater than zero, which may correspond to the total number n of the views $A_k$ (k=1 ... n) used in the respective case,
$c_{ij}$ is a selectable coefficient matrix for combining or mixing on the grid the various bits of partial information originating from the views $A_k$ (k=1 ... n), and
IntegerPart is a function for generating the greatest integral number that does not exceed the argument put in square brackets.

In principle, the assignment of bits of partial information from the views $A_k$ (k=1 ... n) to pixels $\alpha_{ij}$ may also be effected in the way described in the present applicant's WO 03/24122, i.e., one or several pixels $\alpha_{ij}$ are assigned partial image information that is a mix of bits of partial image information from two or more views.

Further, the optical imaging elements $\beta_{pq}$ are arranged on the structured plate according to their kind of imaging $\lambda_b$, pursuant to the equation $$b = p - d_{pq} \cdot q - n_m \cdot IntegerPart\left[\frac{p - d_{pq} \cdot q - 1}{n_m}\right],$$

where
p is the index of an optical imaging element $\beta_{pq}$ in a row of the grid on the structured plate,
q is the index of an optical imaging element $\beta_{pq}$ in a column of the grid on the structured plate,
b is an integral number that defines, for an optical imaging element $\beta_{pq}$ in the position p,q, the kind of optical imaging $\lambda_b$ and may adopt values between 1 and $b_{max}$,
$n_m$ is an integral value greater than zero, which preferably corresponds to the total number k of the views $A_k$ presented in the combination image,
$d_{pq}$ is a selectable mask coefficient matrix for varying the arrangement of optical imaging elements $\beta_{pq}$ on the structured plate, and
IntegerPart is a function for generating the greatest integral number that does not exceed the argument put in square brackets.

It should be noted here that in the above equation—just as in all further equations mentioned hereinafter—the expression multiplication of a matrix (here, e.g., $d_{pq}$) by a number (here, e.g., q) does not, of course, mean a multiplication of the entire matrix with a scalar, as otherwise the result would be a matrix again. Rather, the (scalar) co-efficient entered in the matrix in the respective position (here, e.g., p,q) is multiplied by the respective number. The result is always a number.

Let us assume that, for example, $b_{max}$=5 kinds of optical imaging $\lambda_b$ have been specified, with $\lambda_1$ denoting imaging through a red filter, $\lambda_2$ denoting imaging through a green filter, $\lambda_3$ denoting imaging through a blue filter, $\lambda_4$ denoting imaging through a filter essentially opaque (non-transparent) to visible light, and $\lambda_5$ denoting imaging through a cylinder lens. Let us further assume that all optical imaging elements $\beta_{pq}$ on the structured plate are of rectangular shape; this makes up an orthogonal grid p,q on the structured plate. The area of an optical imaging element $\beta_{pq}$ is between several tens of thousands of square micrometers and several square millimeters, as a rule. With these assumptions, and with the further parameters $d_{pq}$=−1 and $n_m$=5, there would be arranged on the structured plate periodic, inclined stripes of red, green, blue and opaque filters, and cylinder lenses. In this example, the cylinder lenses have such a focal length that the grid of pixels approximately lies in the focal plane.

Even more favorable for 3D presentation is the case that a lens or cylinder lens horizontally extends over the size of several pixels $\alpha_{ij}$. This case, too, is completely and unambiguously covered by the above equation for structuring the optical imaging elements $\beta_{pq}$ on the structured plate. For this purpose, a cylinder lens is segmented, with each lens segment corresponding to a separate kind of optical imaging $\lambda_b$. Thus, a cylinder lens extending over, say, three horizontally adjacent pixels $\alpha_{ij}$ would (by imagination) be broken down into three segments, and the three different segments would be assigned three different kinds of optical imaging $\lambda_x$, $\lambda_{x+1}$ and $\lambda_{x+2}$.

Unless such a whole cylinder lens is composed of Fresnel-like segments, the said cylinder lens segments should, of course, always be arranged side by side, as it is the case with a natural cylinder lens, i.e., in case of three lens segments, the left lens segment is left of the middle segment, and the right segment is right of the middle segment. In practical terms, only one (whole) lens or cylinder lens would be provided on the structured plate, while the splitting up into segments would be merely imaginary. The number of segments per lens may, of course, also be greater than three.

With regard to the plane of rows q and columns p, each optical imaging element $\beta_{pq}$ has an essentially polygonal, preferably rectangular, outline.

The distance z between the side of the structured plate facing the grid of pixels $\alpha_{ij}$ and the grid of pixels $\alpha_{ij}$, measured along the viewing direction, is, for example, about 0 mm to 25 mm. Other distances z are possible, too. In particular, the substrate of a cylinder lens of the structured plate may directly rest on the image display device.

Preferably, the kinds $\lambda_b$ of optical imaging elements $\beta_{pq}$ in the grid of rows q and columns p alternate from row to row and/or from column to column, or within the rows and/or columns.

The image display device provided may be a color LC display, a plasma display, an OLED display, an LED display, a front- or back-projection display, an electroluminescent display, or a laser-beam-illuminated display. Image display devices of other kinds are also feasible, of course.

Further, in a preferred embodiment, the area centers of at least two optical imaging elements $\beta_{pq}$ are shifted relative to each other in the direction of the rows q and/or columns p, by an amount that is not an integral multiple of the height of the rows q or the width of the columns p, respectively.

Moreover, it is sometimes of advantage if the optical imaging elements $\beta_{pq}$ on the structured plate are holographic-optical elements (HOEs).

Furthermore, the structured plate may be configured to be detachable from the image display device. Detaching the structured plate from the image display device is advantageous especially if the user wants purely two-dimensional image information or text to be displayed. The detachment of the structured plate from, and its re-attachment to, the image-display device are quasi-equivalent to a switching between 2D and 3D modes and vice versa, respectively.

Within the scope of the present invention, a method is proposed for fabricating a structured plate to be used in arrangements according to the invention, the said method comprising the following steps:

Punching a pattern of holes into a lenticular screen,
Exposure and full development of a photographic film that will then serve as a filter array and approximately has the dimensions of the lenticular screen, and on which the filters that are essentially transparent to visible light are arranged in positions corresponding to the non-perforated areas of the lenticular screen,
Aligning the filter array with, and laminating it to the substrate side of, the lenticular screen.

An alternative method to fabricate a structured plate comprises the following steps:

Making a lenticular screen that, in a number of partial areas, has a plane surface instead of a lenticular surface,
Exposure and full development of a photographic film that will then serve as a filter array and approximately has the dimensions of the lenticular screen, and on which the filters that are essentially transparent to visible light are arranged in positions corresponding to the non-plane areas of the lenticular screen,
Aligning the filter array with, and laminating it to the substrate side of, the lenticular screen.

The first two steps in either of the two fabrication methods may be exchanged as well. Alternatively to exposing the filter, a filter array structure can be printed onto the substrate side of the lenticular screen. Further, it is possible to construct the structured plate from a number of layers.

BRIEF DESCRIPTION OF THE DRAWINGS

Below, the invention is described in detail with reference to the accompanying drawings, in which FIG. 1a is a sketch illustrating the design principle of a structured plate in arrangements according to the invention, FIG. 1b is a sketch illustrating the principle of arranging different kinds $\lambda_b$ of optical imaging elements $\beta_{pq}$ on the structured plate shown in FIG. 1a, FIG. 2 shows an example of assigning bits of partial information from the views $A_k$ (k=1 . . . n) to pixels $\alpha_{ij}$.

FIG. 5 is a sketch illustrating the design principle of a second structured plate in arrangements according to the invention, FIG. 6 shows another example of assigning bits of partial information from the views $A_k$ (k=1 . . . n) to pixels $\alpha_{ij}$, matching the structured plate shown in FIG. 5.

Figure 3:
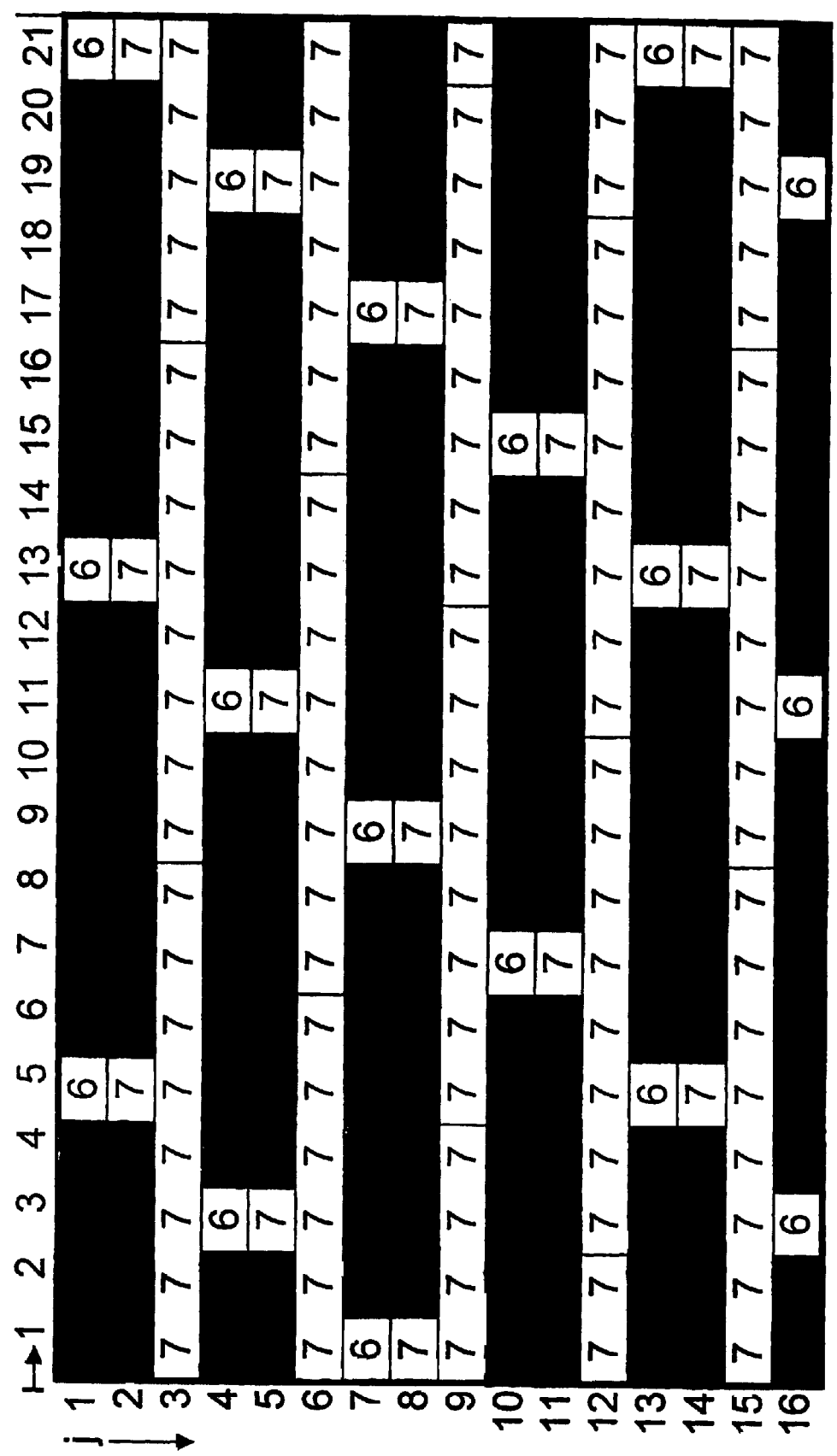
FIG. 3 shows an example of what one viewer's eye may see, given the design and arrangement shown in FIGS. 1 and 2.

For the sake of clarity, the drawings are not to scale, as a rule, and they show only parts of the respective total views.

DETAILED DESCRIPTION OF THE INVENTION

Let us assume that, in the embodiment examples described below, the image display device is a 15.1" LCD of LG make with a full-color pixel pitch of 0.3 mm, on which there is made visible simultaneously a great number of individual pixels $\alpha_{ij}$ (here: the RGB color subpixels) in a grid of rows j and columns i, with the pixels $\alpha_{ij}$ presenting bits of partial information from several views $A_k$ (k=1 . . . n) of the scene or object. Let us further assume, in this example, that the structured plate, by means of which propagation directions for the light radiated by the pixels $\alpha_{ij}$ are established, is always arranged in front of the image display device (seen in the viewing direction).

Figure 1B:
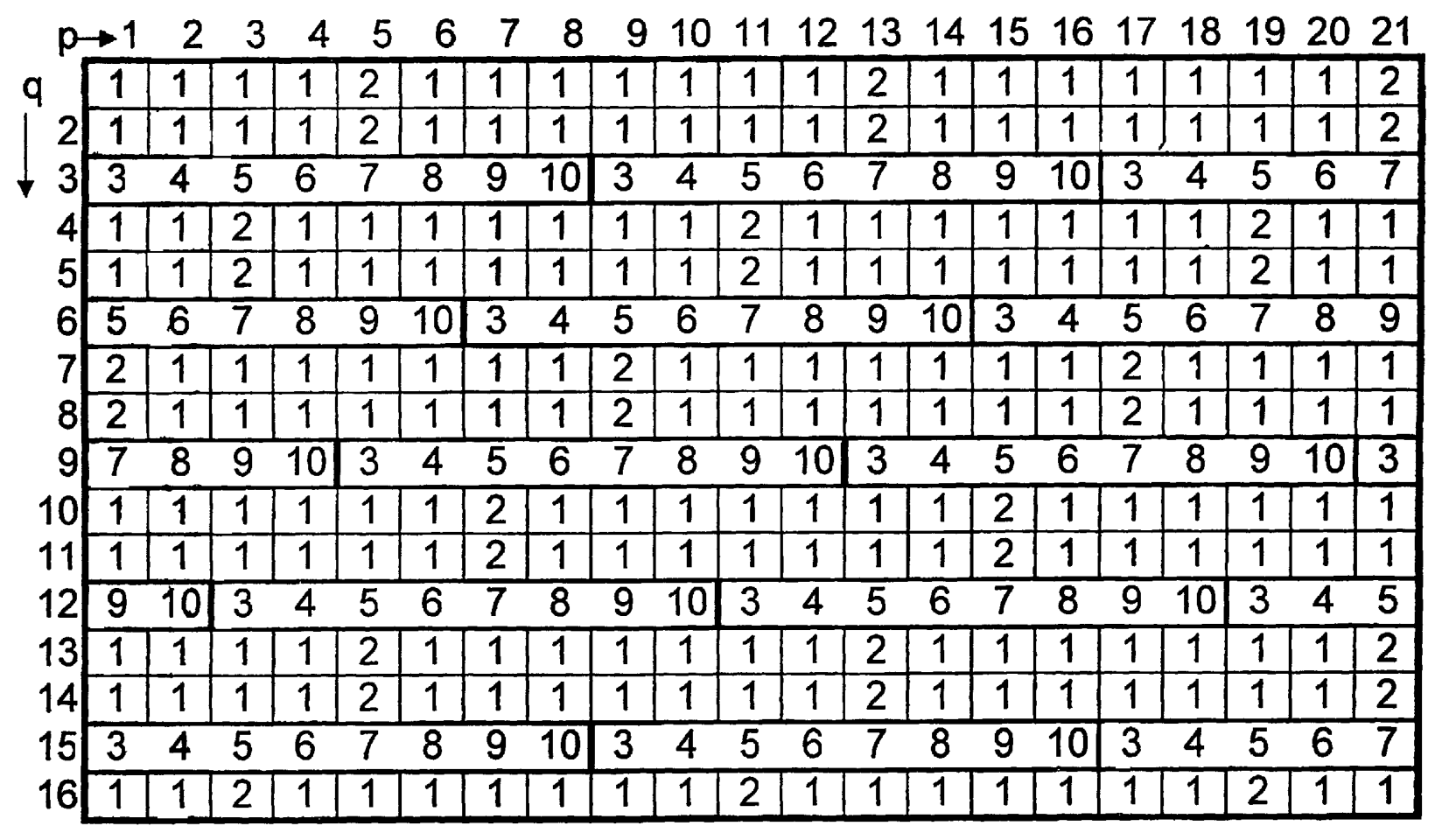

FIG. 1a is a sketch illustrating the principle of the design of a structured plate in arrangements according to the invention, this structured plate containing a great number of optical imaging elements $\beta_{pq}$ arranged in a grid of rows q and columns p and intended for establishing the said propagation directions. The structured plate simultaneously contains the following kinds $\lambda_b$ of optical imaging elements $\beta_{pq}$: wavelength filter (T, S) and cylinder lens (L). "T" denotes wavelength filters that are essentially transparent to visible light, and "S" such that are opaque. "L" denotes cylinder lenses, the horizontal dimension of which is, for example, about 8 times that of a wavelength filter here. This is indicated by the edges of the lenses (L). Let the axis of symmetry of all cylinder lenses (L) be vertical here; not every lens (L) is shown completely in FIG. 1a. FIG. 1b is a sketch illustrating the principle of arranging different kinds $\lambda_b$ of optical imaging elements $\beta_{pq}$ on the structured plate shown in FIG. 1a. Here, $\lambda_1$ denotes imaging by means of opaque wavelength filters, $\lambda_2$ denotes imaging by means of wavelength filters transparent to visible light, and $\lambda_3$-$\lambda_{10}$ denote cylinder lens segments of equal width formed in a left-to-right succession if a cylinder lens made of PMMA (refractive index approximately 1.4) having a radius R=1.2 mm (focal lengths approx. 3 mm) and a width of approx. 0.8 mm is divided into 8 segments.

The optical imaging elements $\beta_{pq}$ are arranged on the structured plate according to their kind of imaging $\lambda_b$, pursuant to the equation already given above, viz.

$$b = p - d_{pq} \cdot q - n_m \cdot IntegerPart\left[\frac{p - d_{pq} \cdot q - 1}{n_m}\right],$$

where
- p is the index of an optical imaging element $\lambda_{pq}$ in a row of the grid on the structured plate,
- q is the index of an optical imaging element $\beta_{pq}$ in a column of the grid on the structured plate,
- b is an integral number that defines, for an optical imaging element $\beta_{pq}$ in the position p,q, the kind of optical imaging $\lambda_b$ and may adopt values between 1 and $b_{max}$ (here: $b_{max}=10$),
- $n_m$ is an integral value greater than zero, which preferably corresponds to the total number k of the views $A_k$ presented in the combination image,
- $d_{pq}$ is a selectable mask coefficient matrix for varying the arrangement of optical imaging elements $\beta_{pq}$ on the structured plate, and
- IntegerPart is a function for generating the greatest integral number that does not exceed the argument put in square brackets.

With regard to the plane of rows q and columns p, each optical imaging element $\beta_{pq}$ has an essentially polygonal, preferably rectangular, outline, which is, for example, about 0.1 mm wide and 0.3 mm high. Preferably, the width and height are multiplied by a corrective factor 0.95<f<1. A matrix $d_{pq}$ that corresponds to FIG. 1b can be given. The distance z between the side of the structured plate facing the grid of pixels $\alpha_{ij}$ and the grid of pixels $\alpha_{ij}$, measured along the viewing direction, is about 1 to 2 mm, for example.

Preferably, the image display device is coupled with an electronic control system in such a way that bits of partial information from the views $A_k$ (k=1 . . . n) are assigned to pixels $\alpha_{ij}$ in positions ij in accordance with the following equation $$k = i - c_{ij} \cdot j - n' \cdot IntegerPart\left[\frac{i - c_{ij} \cdot j - 1}{n'}\right],$$

where
- i is the index of a pixel $\alpha_{ij}$ in a row of the grid,
- j is the index of a pixel $\alpha_{ij}$ in a column of the grid,
- k is the consecutive number of the view $A_k$ (k=1 . . . n) from which the partial information to be presented by a particular pixel $\alpha_{ij}$ originates,
- n' is an integral number greater than zero, which may correspond to the total number n of the views $A_k$ (k=1 . . . n) used in the respective case,
- $c_{ij}$ is a selectable coefficient matrix for combining or mixing on the grid the various bits of partial information originating from the views $A_k$ (k=1 . . . n), and
- IntegerPart is a function for generating the greatest integral number that does not exceed the argument put in square brackets.

FIG. 2 shows an example of the assignment of bits of partial information from the views $A_k$ (k=1 . . . n, n=8) to pixels. $\alpha_{ij}$. A corresponding matrix $c_{ij}$ can be given.

If the structured plate described above is provided in front of the said image display device, the said propagation directions are established in such a way that they, within a viewing space occupied by the viewer(s), intersect in a great number of intersection points, each of which corresponds to a viewing position, so that, from any of these viewing positions, a viewer sees bits of partial information from a first selection with one eye and bits of partial information from a second selection of views $A_k$ (k=1 . . . n) with the other eye.

Figure 4:
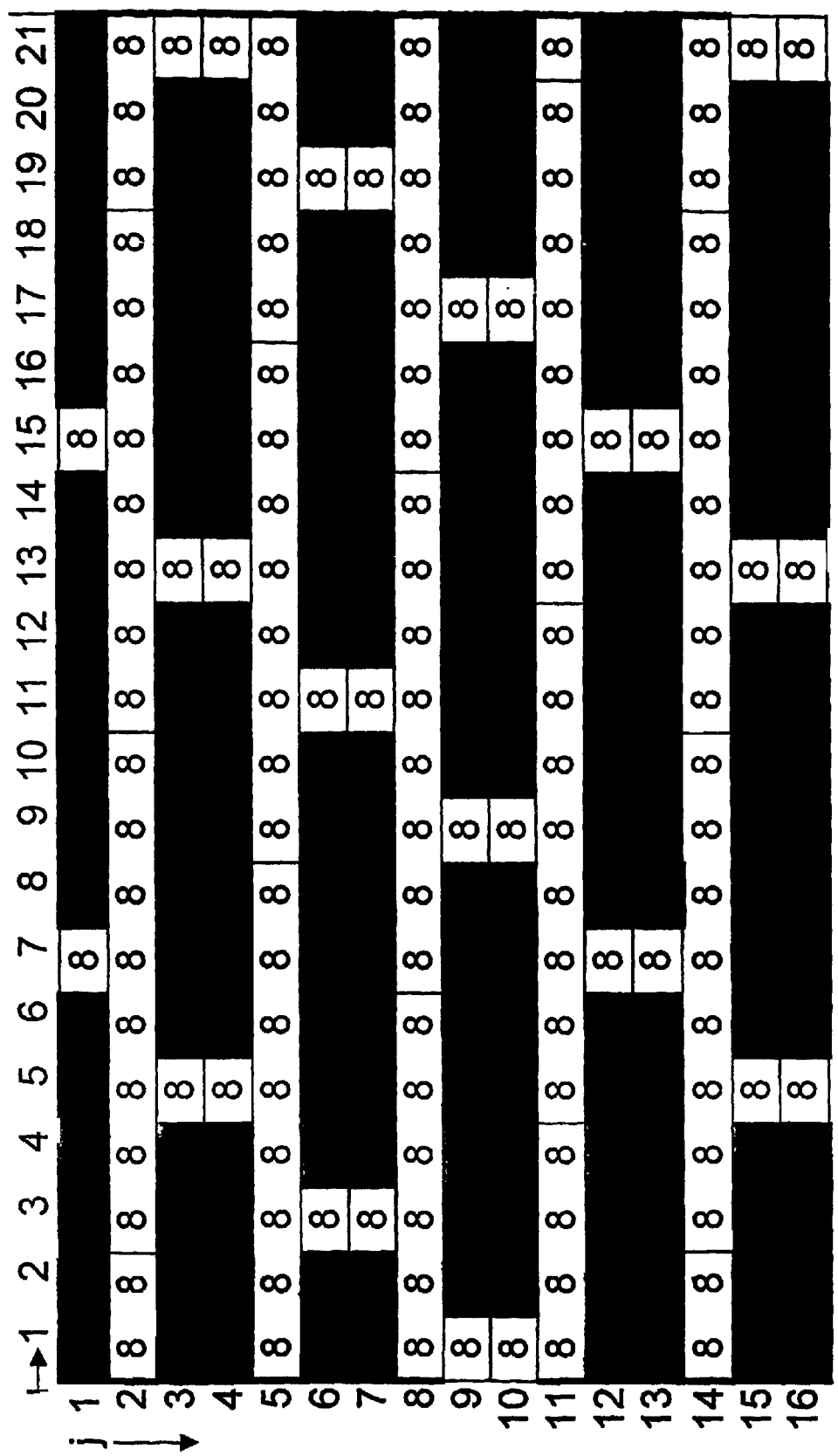
FIG. 4 shows an example of what another viewer's eye may see, given the design and arrangement shown in FIGS. 1 and 2

This is shown schematically in FIGS. 3 and 4 for two different eye positions, each of which represents a viewing position. The figures do not explicitly show the propagation directions, but the pixels or pixel segments visible to the respective eye.

FIG. 3 shows the pixels visible in every third row j due to the lenses L, whereas the other rows are partially or completely invisible due to imaging by means of the wavelength filters. Here, for example, the viewer's eye in the respective position would almost exclusively see partial image information from view 7 and, in a low proportion, from view 6.

FIG. 4 illustrates the visibility situation for a different eye position. Here, the pixels visible in those rows j for which a(j mod 3=2) is true are imaged due to the lenses L, whereas the other rows are partially or completely invisible due to imaging by means of the wavelength filters. A viewer's eye in this position, for example, would exclusively see bits of partial information from view 8.

It should be noted in addition that the lenses cause a visual magnification of the partial image information presented, so that—depending on the configuration of the lenses—several of the pixels visible in the rows j as shown in FIGS. 3 and FIG. 4 present exactly the same image content, because they correspond to the lens image(s) of one or several pixels $\alpha_{ij}$.

Given the visibility conditions as shown in FIGS. 3 and 4 for two eyes of a viewer, the viewer will see a spatial image due to the different views seen by either eye.

It should further be noted that, in case of a structured plate as shown in FIG. 1a, the area centers of at least two optical imaging elements $\beta_{pq}$ are shifted relative to each other along the direction of the rows q, the amount of this shift being not equal to an integral multiple of the width of the columns p. This applies, e.g., to a lens "L" that is composed of several optical imaging elements $\beta_{pq}$, if the amount of shift relative to the wavelength filters "S" or "T" is regarded.

FIG. 5 is a sketch illustrating another example of a design principle of a structured plate in arrangements according to the invention, with the structured plate containing a great number of optical imaging elements $\beta_{pq}$ arranged in a grid of rows q and columns p and intended for establishing the said propagation directions. The structured plate simultaneously contains the following kinds $\lambda_b$ of optical imaging elements $\beta_{pq}$: wavelength filter (T, S) and cylinder lens (L). "T" again denotes wavelength filters that are essentially transparent to visible light, and "S" such that are opaque. "L" denotes cylinder lenses, the horizontal dimension of which is, here again, about 8 times that of a wavelength filter. This is indicated by the edges of the lenses (L). Let the axis of symmetry of all cylinder lenses (L) be vertical again; not every lens (L) is shown completely in FIG. 5.

Corresponding to this, FIG. 6 shows a possible combination image for the assignment of partial information from different views $A_k$ (k=1 . . . n) to the pixels $\alpha_{ij}$ of the image display device.

Figure 7:
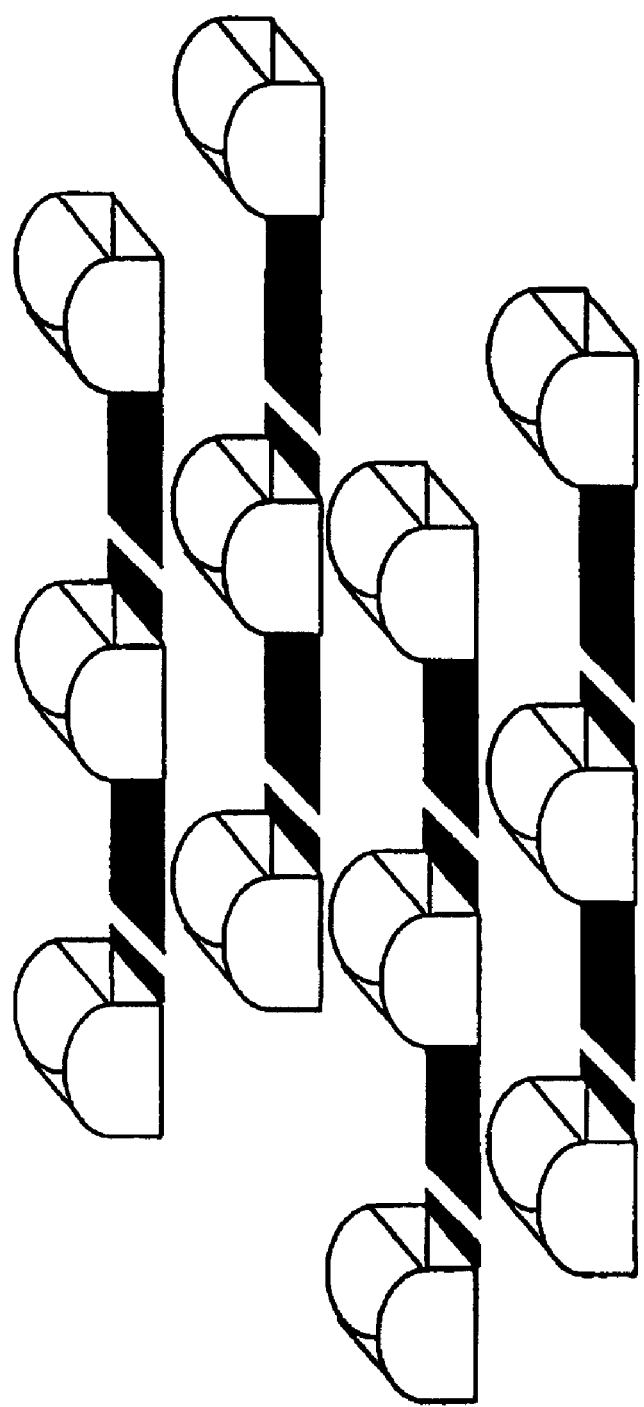
FIG. 7 is a schematic perspective view of another embodiment of a structured plate for arrangements according to the invention.

FIG. 7 is a schematic perspective view of another embodiment of a structured plate for arrangements according to the invention. The figure shows part of a structured plate, lucidly illustrating its possible structure. For the sake of clarity, the various rows are shown separated from each other.

Further embodiments of the structured plate are also feasible, including such using kinds of optical imaging that are not explicitly mentioned herein.

The invention improves the perceptibility of a 3D presentation on the basis of several views of a scene or object. Further it ensures a good brightness of the 3D image.

What is claimed is:

1. An arrangement for spatially displaying a scene or an object, comprising:
   an image display device, on which a great number of individual pixels ($\alpha_{ij}$) arranged in a grid of rows (j) and columns (i) are made visible simultaneously, the pixels ($\alpha_{ij}$) rendering bits of partial information from several views ($A_K$) (k=1 . . . n, n>1) of the scene or object;
   a structured plate, arranged in front of or behind the image display device, by which propagation directions are established for light radiated by the pixels ($\alpha_{ij}$),
   wherein the structured plate contains a great number of optical imaging elements ($\beta_{pq}$) arranged in a grid of rows q and columns p for establishing the propagation directions, the structured plate including simultaneously at least two of the following kinds of optical imaging elements ($\beta_{pq}$), wavelength filters, gray level filters, a spherical lens, a cylinder lens or a prism,
   wherein, within a viewing space occupied by a viewer, the propagation directions intersect in a great number of intersection points, each of which corresponds to a viewing position, such that, from any of the viewing positions, a viewer visually perceives bits of partial information from a first selection with one eye and bits of partial information from a second selection of views ($A_k$) (k=1 . . . n) with the other eye; and
   wherein the image display device is coupled with an electronic control system such that the assignment of bits of partial information from the views ($A_k$) (k=1 . . . n) to pixels ($\alpha_{ij}$) of the position (i,j) is effected according to the equation $$k = i - c_{ij} \cdot j - n' \cdot IntegerPart\left[\frac{i - c_{ij} \cdot j - 1}{n'}\right],$$

where
(i) is the index of a pixel ($\alpha_{ij}$) in a row of the grid,
(j) is the index of a pixel ($\alpha_{ij}$) in a column of the grid,
(k) is the consecutive number of the view ($A_k$) (k=1 . . . n) from which the partial information to be presented by a particular pixel ($\alpha_{ij}$) originates,
(n') is an integral number greater than zero, which may correspond to the total number (n) of the views ($A_k$) (k=1 . . . n) used in the respective case,
($c_{ij}$) is a selectable coefficient matrix for combining or mixing on the grid the various bits of partial information originating from the views ($A_k$) (k=1 . . . n), and
IntegerPart is a function for generating the greatest integral number that does not exceed the argument put in square brackets.

2. An arrangement for spatially displaying a scene or an object, comprising:
   an image display device, on which a great number of individual pixels ($\alpha_{ij}$) arranged in a grid of rows (j) and columns (i) are made visible simultaneously, the pixels ($\alpha_{ij}$) rendering bits of partial information from several views($A_k$) (k=1 . . . n, n>1) the scene or object;
   a structured plate, arranged in front of or behind the image display device, by which propagation directions are established for light radiated by the pixels ($\alpha_{ij}$),
   wherein the structured plate contains a great number of optical imaging elements ($\beta_{pq}$) arranged in a grid of rows q and columns p for establishing the propagation directions, the structured plate including simultaneously at least two of the following kinds of optical imaging elements ($\beta_{pq}$), wavelength filters, gray level filters, a spherical lens, a cylinder lens or a prism,
   wherein, within a viewing space occupied by a viewer, the propagation directions intersect in a great number of intersection points, each of which corresponds to a viewing position, such that, from any of the viewing positions, a viewer visually perceives bits of partial information from a first selection with one eye and bits of partial information from a second selection of views ($A_k$) (k=1. . . n) with the other eye; and
   wherein the optical imaging elements ($\beta_{pq}$) are arranged on the structured plate according to their kind of imaging ($\lambda_b$), pursuant to the equation $$b = p - d_{pq} \cdot q - n_m \cdot IntegerPart\left[\frac{p - d_{pq} \cdot q - 1}{n_m}\right],$$

where
(p) is the index of an optical imaging element ($\beta_{pq}$) in a row of the grid on the structured plate,
(q) is the index of an optical imaging element ($\beta_{pq}$) in a column of the grid on the structured plate,
(b) is an integral number that defines, for an optical imaging element ($\beta_{pq}$) in the position (p,q), the kind of optical imaging ($\lambda_b$) and may adopt values between 1 and ($b_{max}$),
($n_m$) is an integral value greater than zero, which preferably corresponds to the total number (k) of the views ($A_k$) presented in the combination image,
($d_{pq}$) is a selectable mask coefficient matrix for varying the arrangement of optical imaging elements ($\beta_{pq}$) on the structured plate, and
IntegerPart is a function for generating the greatest integral number that does not exceed the argument put in square brackets.

* * * * *